United States Patent
Comfort et al.

(10) Patent No.: US 7,922,242 B2
(45) Date of Patent: Apr. 12, 2011

(54) PANORAMIC VEHICLE ROOF MODULE ASSEMBLIES

(75) Inventors: Jeffrey Comfort, Saline, MI (US); Richard Howard Wykoff, Commerce Township, MI (US); Kian-Huat Tan, Westland, MI (US); Matthew John Zaluzec, Canton, MI (US); Bradley S. Bysouth, Commerce Township, MI (US); Michael Musleh, Canton, MI (US); Douglas Michael Martinelli, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 12/482,526

(22) Filed: Jun. 11, 2009

(65) Prior Publication Data
US 2010/0038933 A1 Feb. 18, 2010

Related U.S. Application Data

(63) Continuation-in-part of application No. 12/192,300, filed on Aug. 15, 2008.

(51) Int. Cl.
*B60J 7/02* (2006.01)
(52) U.S. Cl. .................................. 296/216.08; 296/223
(58) Field of Classification Search ........... 296/216.06–216.08, 223 O, 216.03, 296/216.05
See application file for complete search history.

(56) References Cited

U.S. PATENT DOCUMENTS

| | | | |
|---|---|---|---|
| 5,029,937 A | 7/1991 | Yamamoto | |
| 5,100,197 A | 3/1992 | Ichinose et al. | |
| 5,104,178 A | 4/1992 | Bienert | |
| 5,466,038 A | 11/1995 | Fujie et al. | |
| 5,540,478 A * | 7/1996 | Schuch | 296/210 |
| 6,129,413 A | 10/2000 | Klein | |
| 6,443,520 B1 * | 9/2002 | Schmaelzle et al. | 296/216.08 |
| 6,460,920 B1 | 10/2002 | Reinsch | |
| 6,513,865 B1 | 2/2003 | Lutz et al. | |
| 6,619,732 B2 | 9/2003 | Radmanic | |
| 6,644,728 B1 | 11/2003 | Nagashima et al. | |
| 6,817,658 B2 | 11/2004 | Ohnishi et al. | |
| 6,942,286 B2 | 9/2005 | Bohm et al. | |
| 7,073,851 B2 | 7/2006 | Seifert | |
| 7,077,462 B1 | 7/2006 | De Gaillard | |
| 7,243,989 B2 | 7/2007 | Manders | |

(Continued)

OTHER PUBLICATIONS

European Search Report for corresponding Application No. EP 2 154 015 A1, mailed Dec. 1, 2009, 6 pages.

(Continued)

*Primary Examiner* — Dennis H Pedder
(74) *Attorney, Agent, or Firm* — Raymond L. Coppiellie; Brooks Kushman P.C.

(57) ABSTRACT

A panoramic vehicle roof assembly is provided with a first cross member and a second cross member. Each of the first and second cross members is adapted to be mounted to a vehicle body at spaced apart locations. A first extruded side rail and a second extruded side rail are respectively mounted to one of the first and second cross members at spaced apart locations. Each first and second side rail has a drive integrated roof track and an idler integrated roof track. At least one roof panel is supported by at least one of the integrated roof tracks of the side rails. A method of manufacturing a panoramic vehicle roof module assembly is provided.

19 Claims, 10 Drawing Sheets

U.S. PATENT DOCUMENTS

| | | |
|---|---|---|
| 7,425,033 B2 | 9/2008 | Regnier et al. |
| 7,625,040 B2 | 12/2009 | Pollak et al. |
| 7,780,228 B2 * | 8/2010 | Rashidy et al. .......... 296/220.01 |
| 2003/0015891 A1 | 1/2003 | Doll et al. |
| 2006/0108838 A1 | 5/2006 | Diez Esteban et al. |
| 2009/0033128 A1 | 2/2009 | Hoelzel |

OTHER PUBLICATIONS

Office Action for corresponding U.S. Appl. No. 12/192,300, mailed May 12, 2010, 8 pages.

Office Action mailed Dec. 22, 2009 in corresponding U.S. Appl. No. 12/192,300, filed Aug. 15, 2008, 11 pages.

* cited by examiner

PANORAMIC VEHICLE ROOF MODULE ASSEMBLIES

CROSS-REFERENCE TO RELATED APPLICATIONS

This application is a Continuation-in-Part of U.S. application Ser. No. 12/192,300 filed Aug. 15, 2008, which is hereby incorporated herein by reference in its entirety.

BACKGROUND

1. Technical Field

Various embodiments relate to vehicle roof module assemblies.

2. Background Art

Vehicle roof assemblies are typically mounted on vehicle bodies to enclose interiors of the vehicles. Various types of roof assemblies have been employed. Conventionally, panoramic roof assemblies are employed only on specific types of vehicles and cannot be easily interchanged with other vehicles.

SUMMARY

In one embodiment, a panoramic vehicle roof assembly is provided with a first cross member and a second cross member. Each of the first and second cross members is mounted to a vehicle. A first extruded side rail and a second extruded side rail are respectively mounted to one of the first and second cross members. Each first and second side rail has a drive integrated roof track and an idler integrated roof track. A roof panel is supported by at least one integrated roof tracks of the side rails.

In another embodiment, a panoramic vehicle roof module assembly is disclosed with a first cross member and a second cross member. Each of the first and second cross members is adapted to be mounted to a vehicle body at spaced apart locations. A first extruded side rail and a second extruded side rail are respectively mounted to one of the first and second cross members at spaced apart locations. Each first and second side rail has a drive integrated roof track and an idler integrated roof track. Each track is formed therein along a length thereof. A moveable roof panel is supported by the first and second side rails to interface with the first cross member and the second cross member for movement within the drive integrated roof track and the idler integrated roof track. A third extruded side rail and a fourth extruded side rail are respectively mounted to one of the first extruded side rail and the second extruded side rail. Each third and fourth extruded side rail has an idler integrated roof track formed therein along a length thereof. A fixed roof panel is mounted to the third extruded side rail and the fourth extruded side.

In yet another embodiment, a method of manufacturing a panoramic vehicle roof module assembly is provided. A first side rail is extruded having a plurality of integrated tracks formed therein in a single extrusion. A first cross member is provided. A second cross member is provided. The first side rail is mounted to the first cross member and the second cross member. A second side rail is extruded having a plurality of integrated tracks formed therein in a single extrusion. The second side rail is mounted to the first cross member and the second cross member. A third side rail is extruded having at least one integrated track formed therein in a single extrusion. A fourth side rail is extruded having at least one integrated track formed therein in a single extrusion. The third side rail is mounted to one of the first side rail and the second side rail. The fourth side rail is mounted to the other of the first side rail and the second side rail. A third cross member is provided. The third cross member is mounted to the third side rail and the fourth side rail. A first generally transparent roof panel is provided. The first generally transparent roof panel is mounted to the first side rail and the second side rail to interface with the first cross member and the second cross member. A second generally transparent roof panel is provided. The second generally transparent roof panel is mounted to the third side rail and the fourth side rail to interface with the second cross member and the third cross member.

DETAILED DESCRIPTION OF EMBODIMENTS

As required, detailed embodiments are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the multiple embodiments disclosed herein.

Figure 1:
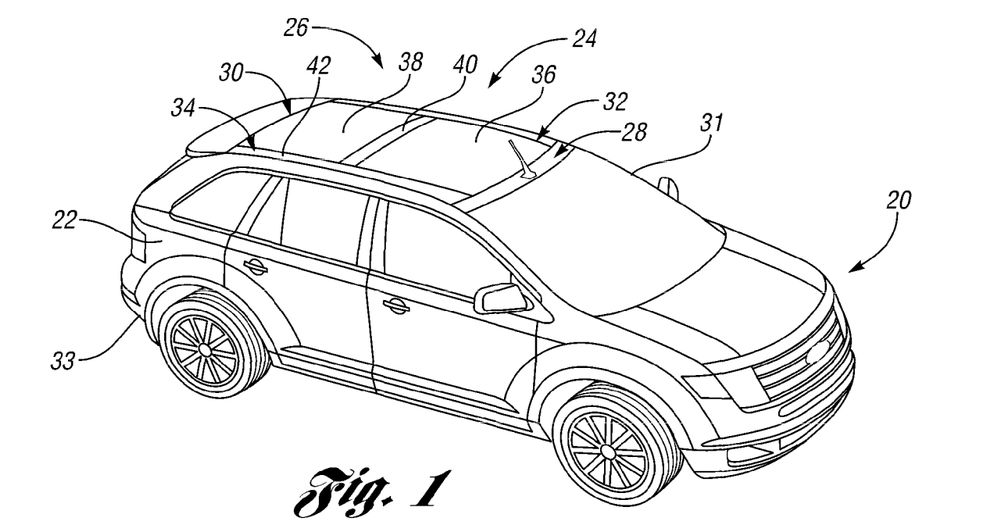
FIG. 1 is a perspective view of a roof module assembly according to an embodiment illustrated assembled to a vehicle.
Figure 2:
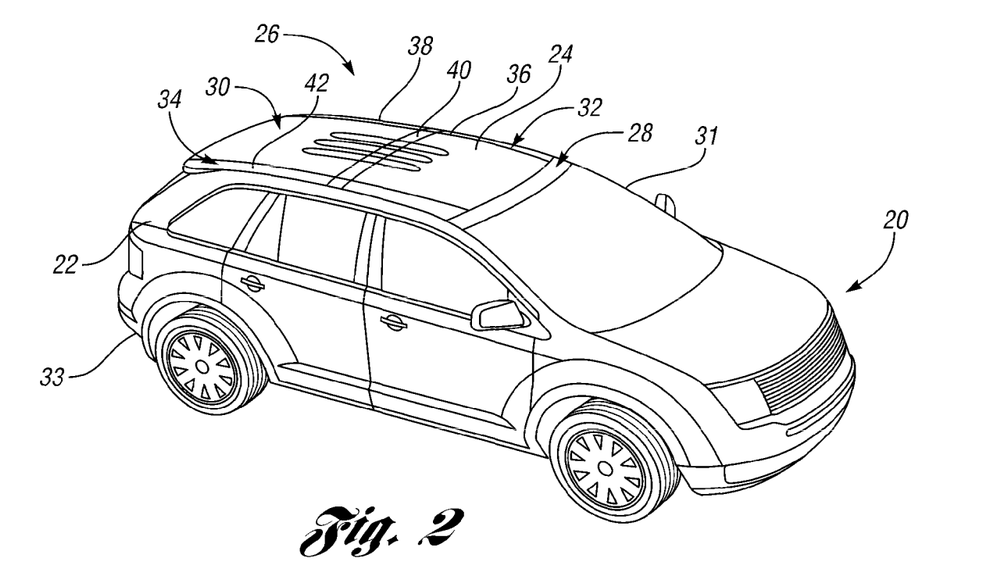
FIG. 2 a perspective view of a roof module assembly according to another embodiment illustrated assembled to a vehicle.

Referring to FIGS. 1 and 2, a passenger vehicle is illustrated and referenced generally by numeral 20. The passenger vehicle 20 has a vehicle body 22, which provides a body structure for the vehicle 20. The vehicle body 22 has a roof 26 that is formed by a roof module assembly 26 attached to the vehicle body 22.

Providing a roof assembly 26 that is modular allows the roof assembly 26 to be adapted for various vehicles 20. Components of the roof assembly 26 can easily be adapted for the vehicle 20 that the roof assembly 26 is going to be mounted on, as is discussed further below. By sharing components for the roof assembly 26 across various types of vehicles 20, production costs for each of the vehicles 20 are reduced. Additionally, tooling costs to manufacture the roof assembly 26 are decreased because the amount of tooling to manufacture various roof assemblies 26 is decreased when compared to requiring various tooling for each roof assembly of each vehicle, as is the prior art.

As illustrated, the roof module assembly 26 is panoramic because the roof module assembly 26 collectively forms the entire roof 26. In the illustrated embodiment, the panoramic roof module assembly 26 allows a complete view for an occupant from an interior of the vehicle 20 for the majority of the roof module assembly 26.

Figure 3:
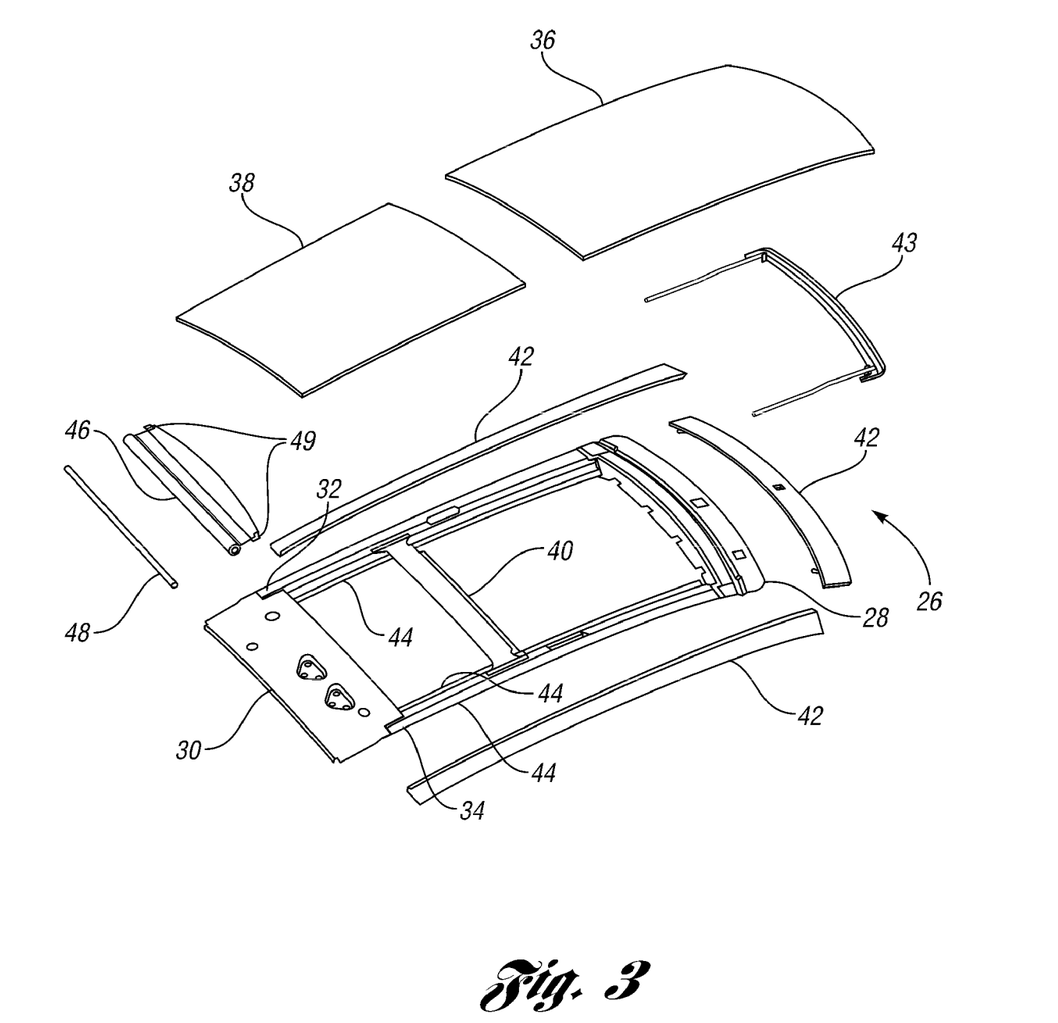
FIG. 3 is an exploded view of the roof module assembly of FIG. 1.

The roof module assembly 26 has a front cross member 28 and a rear cross member 30 as seen in FIG. 3 that each provide support and structure for the roof module assembly 26. In FIG. 1, the front cross member 28 and the rear cross member 30 covered by trim components 42. Under the trim components 42, the front cross member 28 is mounted to the vehicle body 22 near a front portion of the vehicle 20 and the rear cross member 30 is mounted on the vehicle body 22 towards a rear portion of the vehicle, which is opposite to the front portion.

The front cross member 28 and the rear cross member 30 can me made out of any suitable material. Non-limiting examples include aluminum and magnesium.

In prior art roof assemblies, the roof is generally formed out of steel, which is relatively high is weight in comparison to aluminum or magnesium. By stamping aluminum or magnesium for each of the front cross member 28 and the rear cross member 30, the overall weight for the roof module assembly 26 is decreased. Decreasing overall weight for the roof module assembly 26 allows for enhanced vehicle efficiency and performance.

Referring now to FIGS. 1-3, a first side rail 32 and a second side rail 34 are connected between the front cross member 28 and the rear cross member 30. Both the first side rail 32 and the second side rail 34 may be elongated along an entire upper side profile of the vehicle 20 between the front cross member 28 and the rear cross member 30. The first side rail 32 is mounted to the vehicle body 22 of the vehicle along a first lateral side 31 while the second side rail 34 is mounted to the vehicle body 22 of the vehicle 20 along a second lateral side 33, opposite the first side.

As illustrated, both the first side rail 32 and the second side rail 34 support a moveable front roof panel 36 and a stationary rear roof panel 38. Although two roof panels 36, 38 are illustrated, it is to be understood that any suitable quantity of roof panels 36, 38 may be utilized within the scope of the multiple embodiments disclosed herein.

Referring again to FIG. 1, the front roof panel 36 and the rear roof panel 38 are at least partially transparent such that the occupant can see out of the panoramic roof module assembly 26. The front roof panel 36 and the rear roof panel 38 can be tinted to reduce visibility and manage heat. In at least one embodiment, depicted in FIG. 2, the front roof panel 36 and the rear roof panel 38 could be at least partially opaque so that light is not transmitted through the opaque region and the occupant cannot see out of the opaque region of the roof 24. The opaque region could be defined by ornamentation provided on the roof module assembly 26, or alternatively, the opaque region could encompass the entire roof panels 36, 38.

In at least one embodiment, the front roof panel 36 and the rear roof panel 38 are made out of a polycarbonate material that is transparent, as in FIG. 1. In another embodiment, the front roof panel 36 and the rear roof panel 38 are made out of a polycarbonate material that is at least partially opaque, as in FIG. 2. By employing a polycarbonate material for the front roof panel 36 and the rear roof panel 38, weight for the roof module assembly 26 is reduced when compared to roof assemblies utilizing glass. Additionally, utilization of polycarbonate permits molded shapes or contours to cost-effectively form the panels 36, 38. Of course, any suitable polymer, glass or other material for the front roof panel 36 and the rear roof panel 38 may be used within the scope of the multiple embodiments disclosed herein.

As illustrated in FIG. 1, an intermediate cross member 40 is mounted to the first side rail 32 at one end and the second side rail 34 at the second end. The intermediate cross member 40 increases stability and rigidity of the roof module assembly 26 by supporting the front roof panel 36 and the rear roof panel 38. In at least one embodiment, the intermediate cross member 40 is stamped out of aluminum. In another embodiment, the intermediate cross member 40 is stamped out of magnesium. Alternatively, the intermediate cross member 40 can be extruded. Utilization of aluminum or magnesium in comparison to steel decreases the weight for the roof module assembly 26.

In FIGS. 1-3, trim components 42 may be mounted on the front cross member 28, the rear cross member 30, the first side rail 32, and the second side rail 34. The trim components 42 conceal the underlying structural members and provide a quality, Class-A finish for the vehicle 20 that is visually appealing. Additionally, the trim components 42 assist with water management.

The roof module assembly 26 utilizes fewer parts than prior art roof assemblies. Utilization of fewer parts results in weight reduction for the vehicle 20 and cost savings for the manufacturer. In one embodiment, a significant amount of parts and fasteners are eliminated when compared to prior art roof assemblies to manufacture the roof module assembly 26. Additionally, tolerance through the extruded side rails 32, 34 of the roof module assembly 26 is easily controlled. Furthermore, vehicle structural integrity is improved through utilization of the roof module assembly 26. In one embodiment, vehicle stiffness is increased by approximately five percent.

Figure 4:
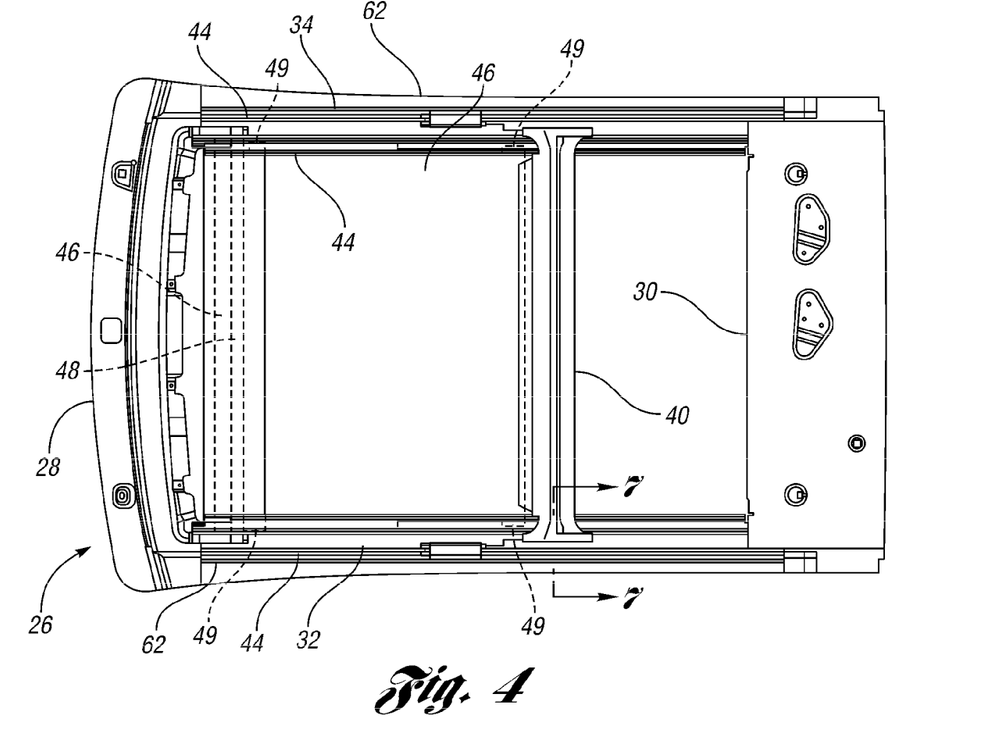
FIG. 4 is a top plan view of a portion of the roof module assembly of FIG. 1.
Figure 5:
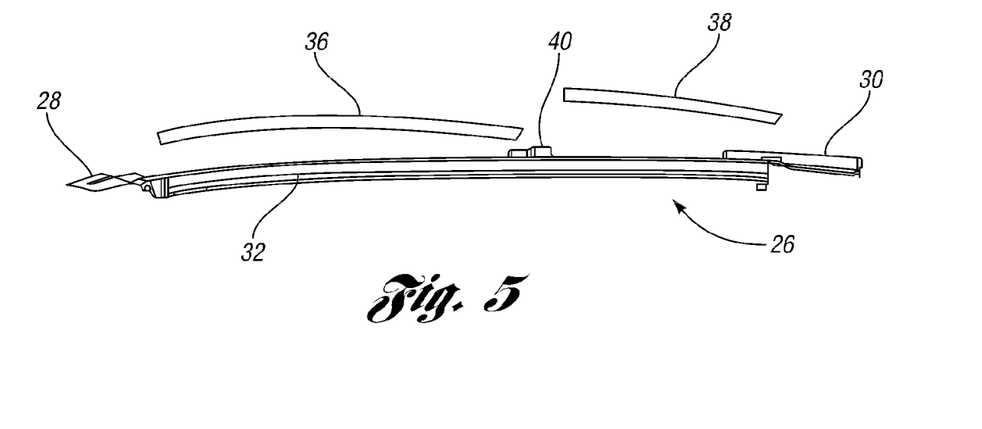
FIG. 5 is a partially exploded side elevation view of the portion of the roof module assembly of FIG. 4.

With reference to FIGS. 3-5, an embodiment of the roof module assembly 26 of FIG. 1 is depicted in greater detail with the trim components 42 removed. To manufacture the roof module assembly 26, the front cross member 28 and the rear cross member 30 are stamped out of a suitable material, such as aluminum or magnesium. In at least one embodiment, an intermediate cross member 40 is also stamped out of a suitable material to be assembled to the roof module assembly 26. The first side rail 32 and the second side rail 34 are extruded from aluminum or magnesium to include a plurality of tracks 44 formed therein. In at least one embodiment, mandrels can be employed during fabrication of the first and second side rails 32, 34 to prevent collapsing of the tracks 44 and other features, such as flanges, of the first and second side rails 32, 34. The first side rail 32 is mounted to the front cross member 28 and the rear cross member 42 and the second side rail is mounted to the front cross member 28 and the rear cross member 42. In at least one embodiment, the intermediate cross member 40 is mounted between the first and second side rails 32, 34.

In at least one embodiment, the first side rail 32 and the second side rail 34 are each welded to the front cross member 28 and the rear cross member 30. The first side rail 32 and the second side rail 34 may be friction stir welded to the front cross member 28 and the rear cross member 30. The first side rail 32 and the second side rail 34 can each be cold metal welded, laser welded, or mechanically fastened. In another embodiment, the first side rail 32 and the second side rail 34 are each adhesively bonded to the front cross member 28 and the rear cross member 30. Of course, any suitable manner of affixing the first side rail 32 and the second side rail 34 to the front cross member 28 and the rear cross member 30 is contemplated within the scope of the embodiments disclosed herein. In addition, the intermediate cross member 40 can be affixed to each of the first side rail 32 and the second side rail 34 in a suitable manner, which include but is not limited to friction stir welding, adhesively bonding, cold metal welding, laser welding, or mechanically fastening.

As illustrated in FIG. 4, the roof module assembly 26 includes a sun shade member 46 that can be mounted to the first and second side rails 32, 34 in a suitable manner so that the sun shade member 46 can be manually or electrically extended or retracted, between a design position and a deployed position. In one embodiment, the sun shade member 46 is mounted directly to the first and second side rails 32, 34 with a fastener, such as a spring-loaded retainer. A tension bar 48 cooperates with the sun shade member 46 as the sun shade member 46 moves between the design position and the extended position. The tension bar 48 may be mounted proximate the sun shade member 46 to support the sun shade member 46 during movement to and from the design position. The tension bar 48 may be extruded from aluminum or magnesium or any other suitable material. The tension bar 48 aligns fabric of the sun shade member 46 with the side rails 32, 34 during movement between the design position and the extended position.

In one embodiment, guides 49 are mounted on the free end of the fabric of the sun shade member 46. The guides 49 can each be mounted within one of the tracks 44 of each of the side rails 32, 34. The guides 49 facilitate movement of the sun shade member 46 from the design position illustrated to the extended position. The sun shade member 46 can be either moved manually or driven by a motor from the design position to the extended position, which is discussed in further detail below.

In the depicted embodiment, the sun shade member 46 is a single sun shade member 46. Two separate sunshade members are not required, as is common in the prior art. Utilization of a single sun shade member 46 decreases the weight of the roof module assembly 26 and also decreases the cost of manufacturing the roof module assembly 26 because fewer components are needed.

As illustrated in FIG. 3, an air deflector 43 may be included in the roof module assembly 26. The air deflector 43 may be mounted in one of the plurality of tracks 44 provided in each of the first and second side rails 32, 34. The air deflector 43 is shown assembled to the roof module 26 and deploys upon opening of the front roof member 36 and retracts upon closing of front roof member 26. The air deflector 43 can be mounted within a track 44 on each of the first and second side rails 32, 34 in any suitable manner.

In FIG. 5, curvature of an embodiment of the portion of the roof module assembly 26 is shown. The depicted side rail 32 can be formed to have any desired curvature and length from front to back that corresponds with a curvature and length of the vehicle body. The roof panels 36, 38 are formed with a corresponding curvature.

In the depicted embodiment, the profile of the front cross member 28, the rear cross member 30 and the intermediate cross member 40 extends above the profile of the side rail 32. When the roof panels 36, 38 are mounted onto the components of the roof module assembly 26 illustrated, the roof panels 36, 38 have a profile extending above the profile of the side rail 32. The profile of the roof panels 36, 38 may form one continuous surface with each of the front cross member 28, the rear cross member 30 and the intermediate cross member 40.

Figure 6:
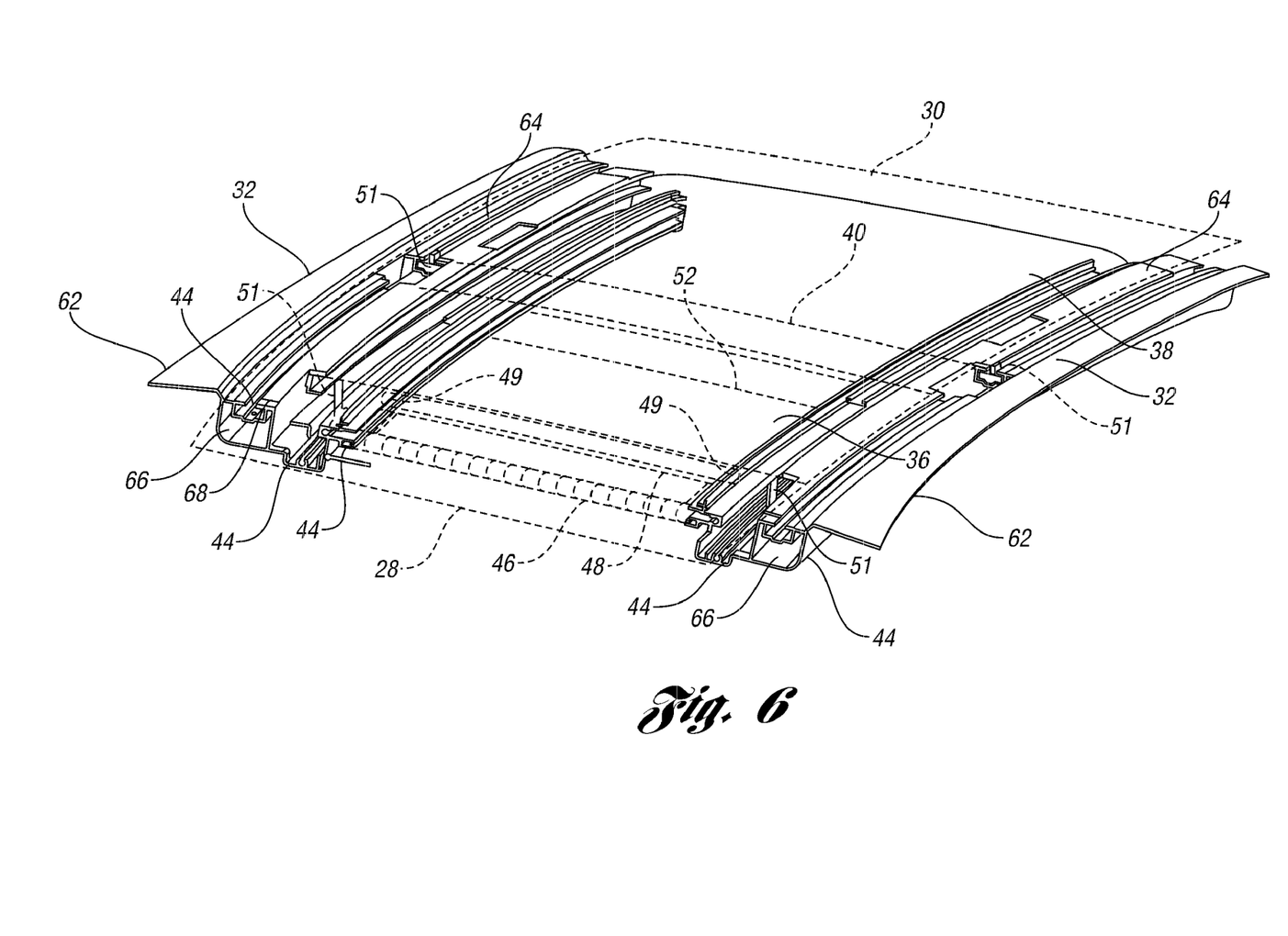
FIG. 6 is a perspective view of the portion of the roof module assembly of FIG. 4.

Referring now to FIG. 6, an embodiment of the side rails 32, 34 of the roof module assembly 26 of FIG. 3 is illustrated. As depicted, the side rails 32, 34 have an elongated profile with a generally consistent cross-section. After extrusion of each side rail 32, 34, portions may be removed from the side rails 32, 34 to facilitate installation of roof panels 36, 38 onto the side rails 32, 34.

In the illustrated embodiment, each side rail 32, 34 includes a plurality of tracks 44 integrally formed therein. The tracks 44 are formed as each side rail 32, 34 is extruded out of aluminum or magnesium to a desired length. The side rails 32, 34 can be formed to any length and can be formed to any curvature.

To mount the side rails 32, 34 to the vehicle body, support flanges 62 are provided on each side rail 32, 34. The support flanges 62 are integrally formed with each side rail 32, 34 when each side rail is extruded. The support flanges 62 facilitate assembly and mounting of the roof module assembly 26 to the vehicle body 20. A seal can be provided between the flanges 62 and the vehicle body 20 for sealing the connection of the roof module assembly 26 to the vehicle body 20.

In the illustrated embodiment, a lower intermediate cross member 52 is provided in additional to an upper intermediate cross member 40. The upper intermediate cross member 40 and the lower intermediate cross member 52 are each affixed to the side rails 32, 34 in a suitable manner, such as through welding or adhesive, as discussed above.

Figure 7:
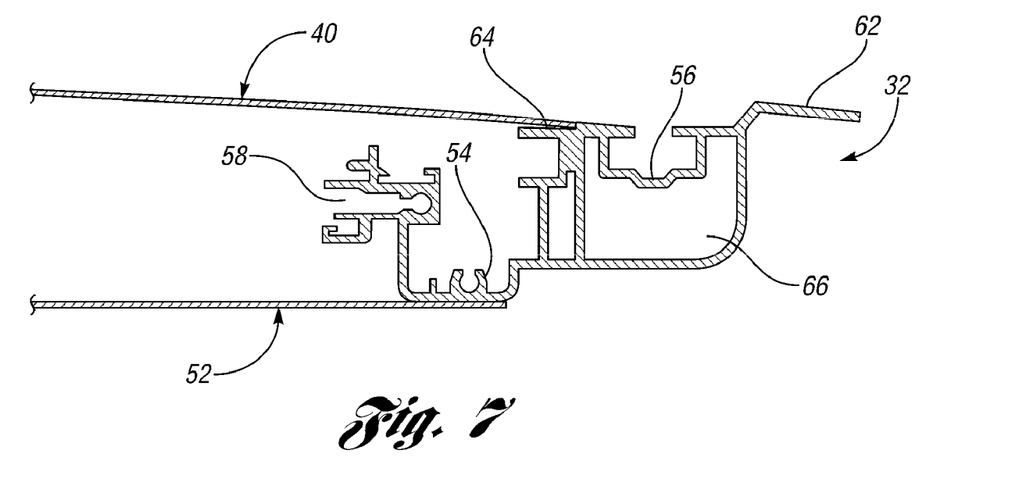
FIG. 7 is a cross-sectional view of FIG. 4 taken along the line 7-7.

In FIG. 7, a cross-sectional view of the portion of the roof module assembly 26 of FIG. 4 is illustrated, taken along the line 7-7. In the depicted embodiment, the upper intermediate cross member 40 is mounted to the each of the side rails 32, 34. The lower cross member 52 is mounted directly to each of the side rails 32, 34. Each of the front cross member 28 and the rear cross member 30 can be mounted to the side rails 32, 34, as illustrated in FIG. 6.

The upper intermediate cross member 40 interfaces with the front roof panel 36 and the rear roof panel 38 to provide further stability for the roof module assembly 26. The lower intermediate cross member 52 may be utilized for supporting a lower headliner attachment within the passenger compartment. Alternatively, the lower intermediate cross member 52 may provide structural support to the roof module assembly 26. The lower intermediate cross member 52 may be extruded or stamped out of aluminum or magnesium. Additionally, the upper intermediate cross member 40 may be formed during the manufacturing process in order to correspond to a pitch of the roof panels 36, 38 however small or great of a pitch desired.

Figure 8:
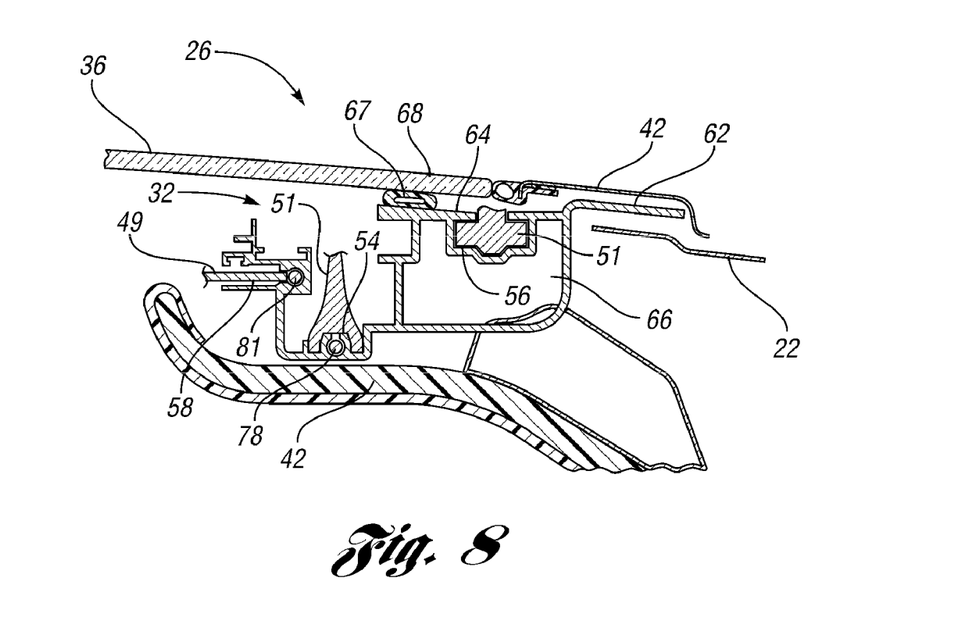
FIG. 8 is a cross-sectional view of a portion of the roof module assembly of FIG. 4.

In FIG. 8, a portion of an embodiment of the roof module assembly 26 of FIG. 3 is depicted. The first side rail 32 is illustrated but it is to be understood that the second side rail 34 would have the mirror image of the first side rail 32.

Figure 10:
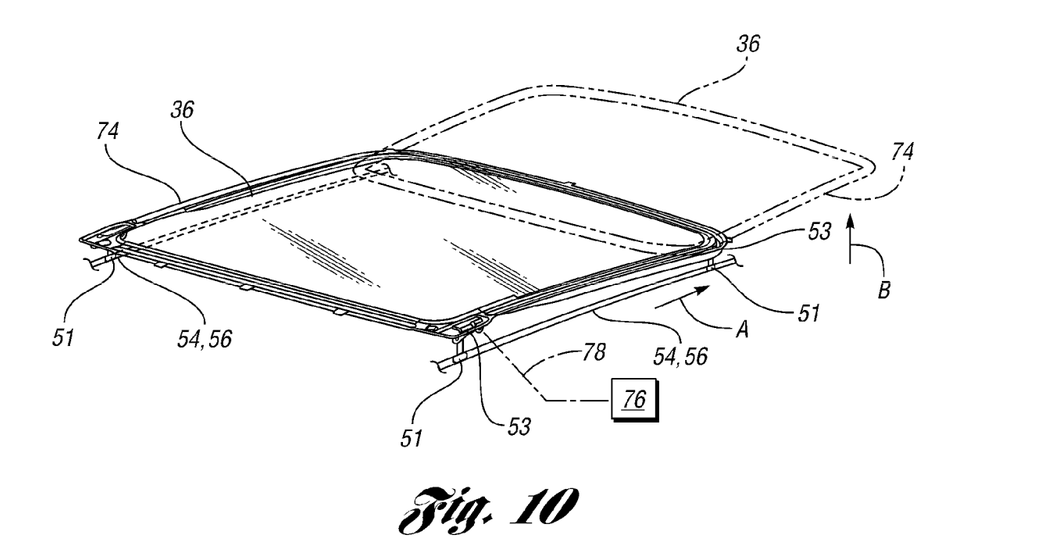
FIG. 10 is a perspective view a portion of the roof module assembly of FIG. 1 according to another embodiment.
Figure 11:
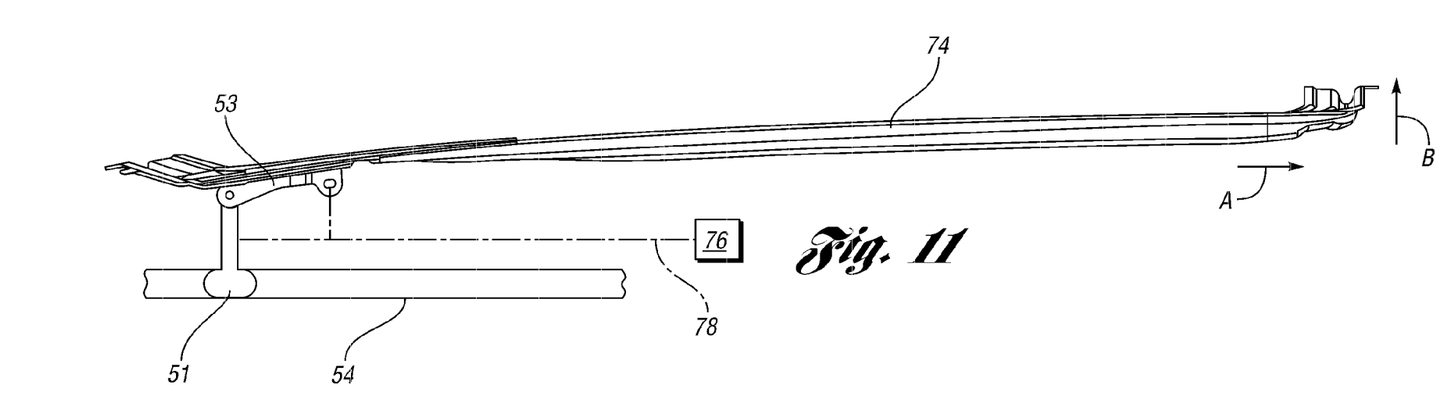
FIG. 11 is a side elevation view of the portion of the roof module assembly of FIG. 10.

The side rail 32 has a plurality of tracks 54, 56, 58. In one embodiment, a front integrated roof track 54 facilitates movement of the front roof panel 36 so that an opening is created when the front roof panel 36 is moved from a design position to an opened or extended position (as seen in FIG. 10-11). The front integrated roof track 54 cooperates with a slider 51 that may be mounted to the roof panel 36 (as seen in FIGS. 10-11) in a suitable manner. The slider 51 can slide within the front integrated roof track 54 to move the roof panel 36. In at least one embodiment, the slider 51 is connected to an electrically powered drive gear unit, such as a motor driven gear unit, by a cable to move the slider 51 and thus, the roof panel 36 along the track 54.

In at least one embodiment, a rear integrated track 56 receives a slider 51 to support and facilitate movement of the front roof panel 36. The rear roof panel 38 of the depicted embodiment is stationary.

It is to be understood that the roof panels 36, 38 can each be moveable, stationary or any combination thereof within the spirit and scope of the embodiments disclosed herein.

In another embodiment, another track 58 is provided within the side rail 32 to cooperate with the guides 49. The guides 49 are mounted to an end of the sun shade member 46 for movement of the sun shade member 46, as discussed above. The track 58 is an integrated sunshade track 58 and controls movement of the guides 49 as the guides 49 moves from the design position to the extended position and from the extended position to the design position. In at least one embodiment, the guides 49 are connected to an electrically powered drive gear unit, such as a motor driven gear unit, by a cable to move the guides 49 and thus, the sun shade member 46 along the track 58.

A primary seal 67 is provided on the flange 64. The front roof panel 36 compresses the seal 67 for sealing the opening. As illustrated, a secondary seal 68 is provided on the trim component 42 to manage and divert water from the side rail 32. In one embodiment, the secondary seal 68 is mounted to the trim component 42 with adhesive.

In at least one embodiment, a reservoir or liquid management cell 66 is integrally formed in the side rail 32. In at least one embodiment, the liquid management cell 66 has an end cap with an aperture provided therein to allow liquid to flow out of the side rail 32.

Figure 9:
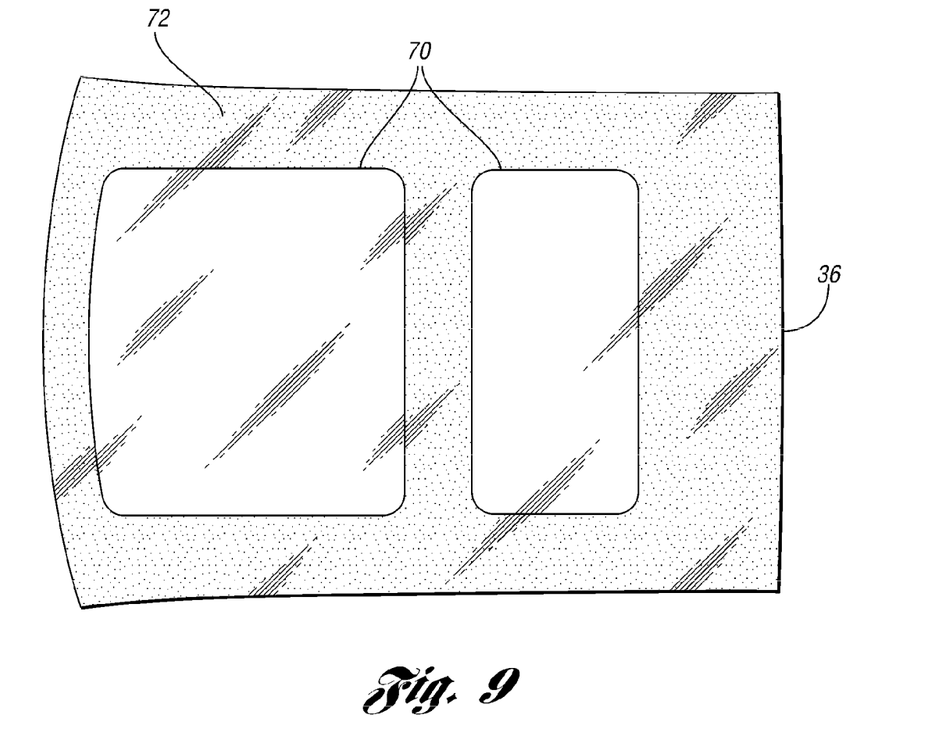
FIG. 9 is a top plan view of a roof panel in accordance with another embodiment disclosed herein.

In at least one embodiment, only one roof panel 36 is supported by the side rails 32, 34. In FIG. 9, one roof panel 36 is formed to cover the entire roof surface so that only one roof panel 36 is needed. In the illustrated embodiment, the roof panel 36 has fixed transparent windows 70 and an opaque surface 72. To manufacture the roof panel 36 as illustrated, the opaque surface 72 is printed onto the transparent roof panel 36. In at least one embodiment, the roof panel 36 has molded-in color, which can be generally transparent or opaque. Alternatively, the different materials can be two-shot molded. The roof panel 36 may be formed out of polycarbonate, glass or any suitable material.

With reference now to FIGS. 10-11, an embodiment of a portion of the roof module assembly 26 of FIG. 1 is depicted. As illustrated, the roof panel 36 is provided with a frame 74. The frame 74 is formed to interface with the front roof panel 36. The frame 74 can be made out of any suitable material, as is known in the prior art.

The roof panel 36 is in the design position in solid. The slider 51 moves along the integrated track 54 and moves the roof panel 32 in a direction indicated by arrow A. A lifting mechanism 53 pivots the roof panel 32 in a direction indicated by arrow B. Collectively, the slider 51 and the lifting mechanism 53 move the roof panel to the extended position, as shown in phantom.

As illustrated, each of the slider 51 and the lifting mechanism 53 is connected to an electric motor 76 with a cable 78. When the motor 76 is activated, the slider 51 and the lifting mechanism 53 are each moved to force the roof panel 36 along the track 54 in the direction indicated by arrow A and to pivot open in the direction indicated by arrow B. Once the roof panel 36 is in the extended position, the motor 76 can be reversed to move the slider 51 and the lifting mechanism 53 to return to the design position. Any suitable motor 76 or electrically powered drive gear unit can be employed within the scope of the multiple embodiments disclosed herein.

Figure 12:
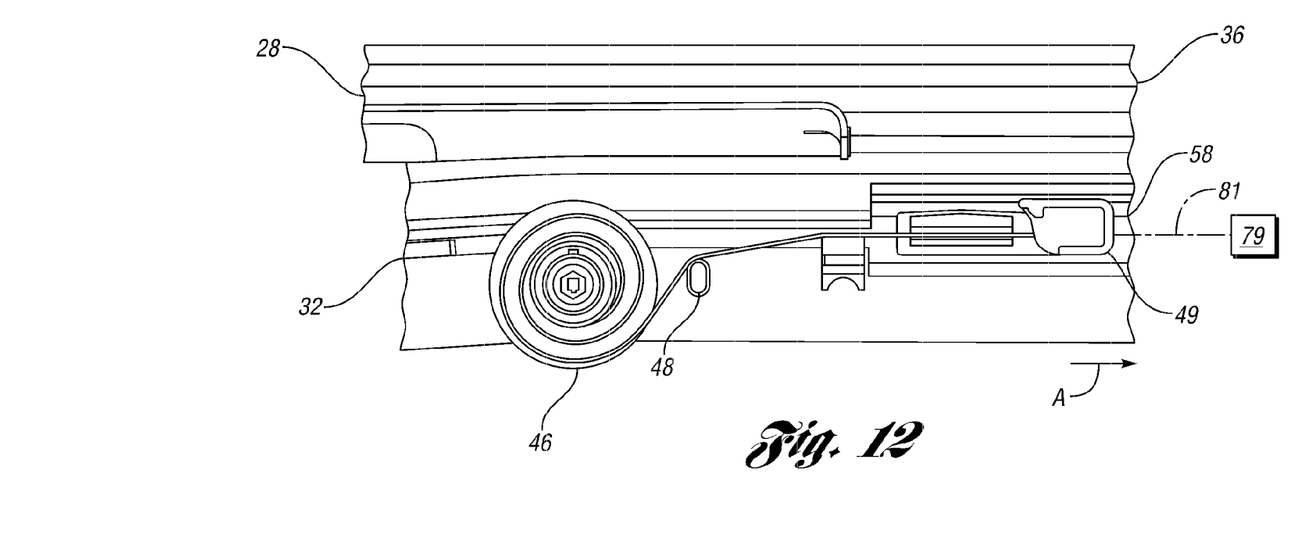
FIG. 12 is a side elevation view of an embodiment of the roof module assembly of FIG. 1.

In FIG. 12, the sun shade member 46 is depicted in connection with the guide 49 in the design position. As illustrated, the sun shade member 46 is mounted to the side rail 32 below the rear cross member 30 so that the sun shade member 46 is generally not visible to the occupant in the design position.

The material of the sun shade member 46 is attached to the guide 49. The guide 49 is mounted within track 58 so that the guide 49 can move along the track 58 in the direction indicated by arrow A to extend the sun shade member 46 to the extended position. In one embodiment, the arrow A is directed towards the rear of the vehicle. In another embodiment, the arrow A is towards the front of the vehicle.

The tension bar 48 is mounted to the side rails 32, 34 to align and prevent wrinkling of the material of the sun shade member 46, when the guide 49 moves between the retracted position and the extended position.

As illustrated, the guide 49 is connected to a motor 79 with cable 81. When the motor 79 is activated, the guide 49 is moved in the direction indicated by arrow A. When the sun shade member 46 and the guide 49 are in the extended position, the motor 79 can return the sun shade 46 to the retracted position. Any suitable motor 79 or electrically powered drive gear unit can be employed within the scope of the multiple embodiments disclosed herein.

In at least one embodiment, the sun shade member 46 includes a spring to bias the sun shade member 46 to pivot in a direction opposite the direction indicated by arrow A. When the guide 49 moves the sun shade member 46 from the extended position to the design position, the biasing member rotates the sun shade member 46 to recoil the material that was extended and return to the design position.

Figure 13:
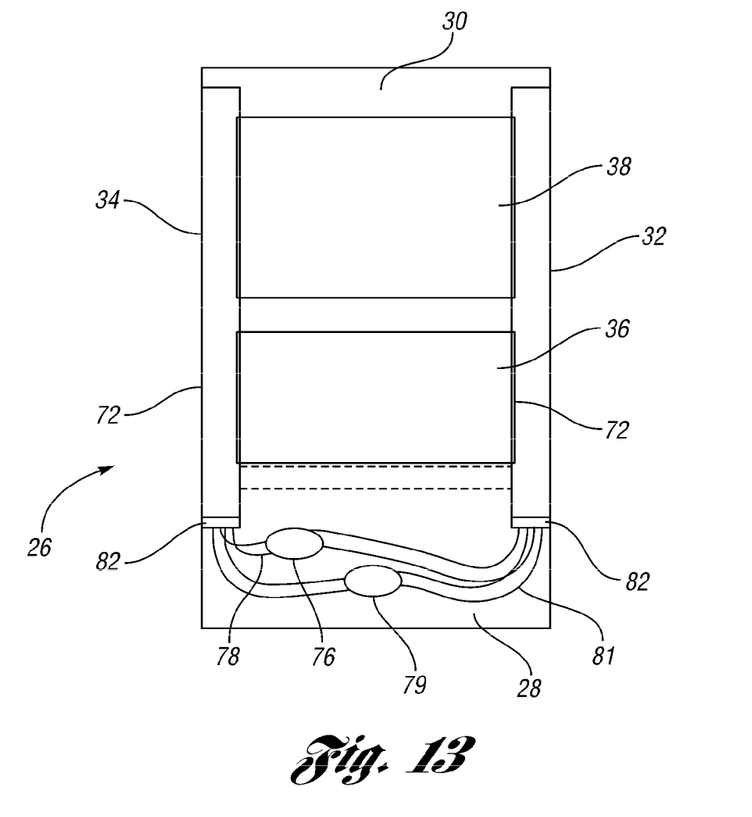
FIG. 13 is a top plan view of an embodiment of a roof module assembly.
Figure 14:
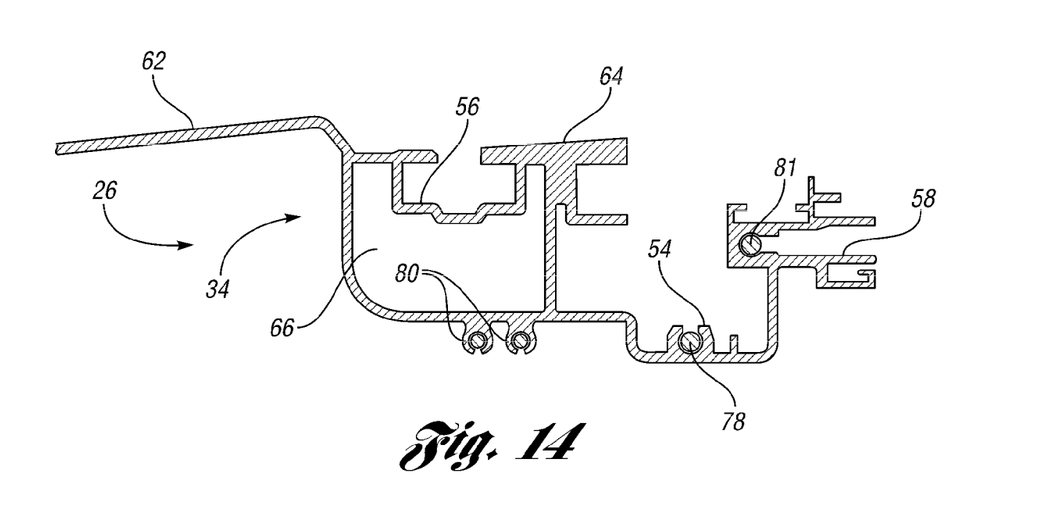
FIG. 14 is a cross-sectional view of the roof module assembly of FIG. 13.

Referring now to FIGS. 13 and 14, another embodiment of a portion of a roof module assembly 26 is illustrated. The roof module assembly 26 includes motors 76, 79 that are each connected to one of the front roof panel 36 and the sun shade member 46 with cables 78, 81. Although two motors 76, 79 are illustrated, any quantity of motors 76, 79 are contemplated within the scope of the multiple embodiments disclosed herein.

In the illustrated embodiment, the cables 78, 81 are mounted within each of the side rails 32, 34 in the integrally formed front roof track 54 and sun shade track 58. The return side for the cables 78, 81 are routed through integrally formed guides 80. The guides 80 are formed with each of the side rails 32, 34 when the side rails 32, 34 are manufactured through extrusion. Incorporation of the guides 80 into the main extruded side rail 34 eliminates a need for a separate return tube, assembly and routing of that return tube to the outside of the rail or roof module assembly 26. The side rail 34 provides protection for the return cable to minimize the possibility of damage to the return cable.

FIG. 14 further depicts the embodiment of the guides 80 formed on the inside of the side rail 34. A pair of guides 80 are illustrated for the return end of the cables 78, 81 from the motors 76, 79. The guides 80 are formed in the liquid management cell 66. The guides 80 may also be formed externally to the liquid management cell 66.

The end of the side rails 32, 34 are plugged with a sealed cap member 82. The sealed cap member 82 further protects cables 78, 81 from liquid and dirt. In at least one embodiment, a molded-in tube is provided from the motor 76, 79 to the end of the side rails 32, 34 to protect the cables 78, 81.

Figure 15:
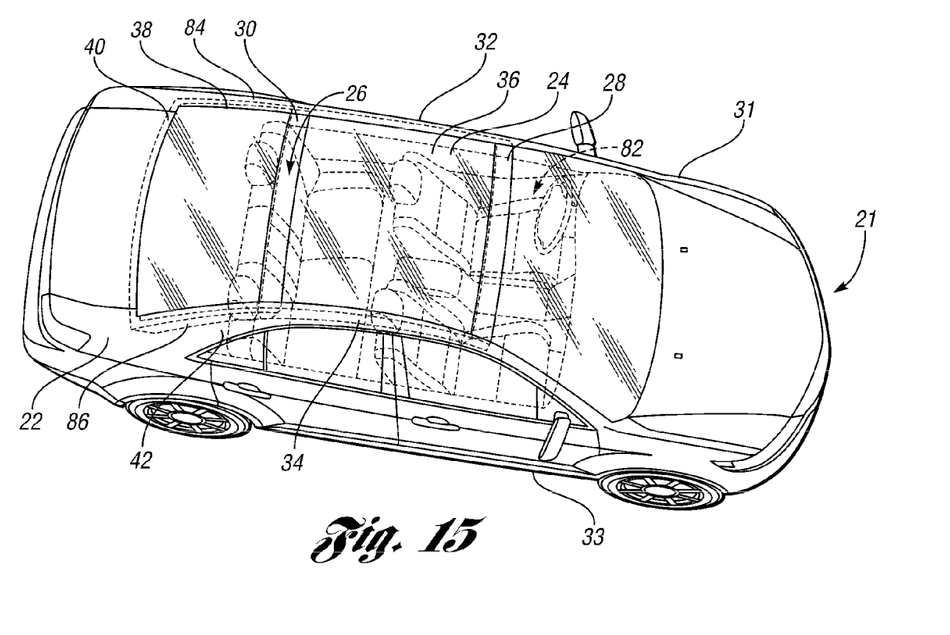
FIG. 15 is a perspective view of a roof module assembly according to an embodiment illustrated assembled to a vehicle in a design position.
Figure 16:
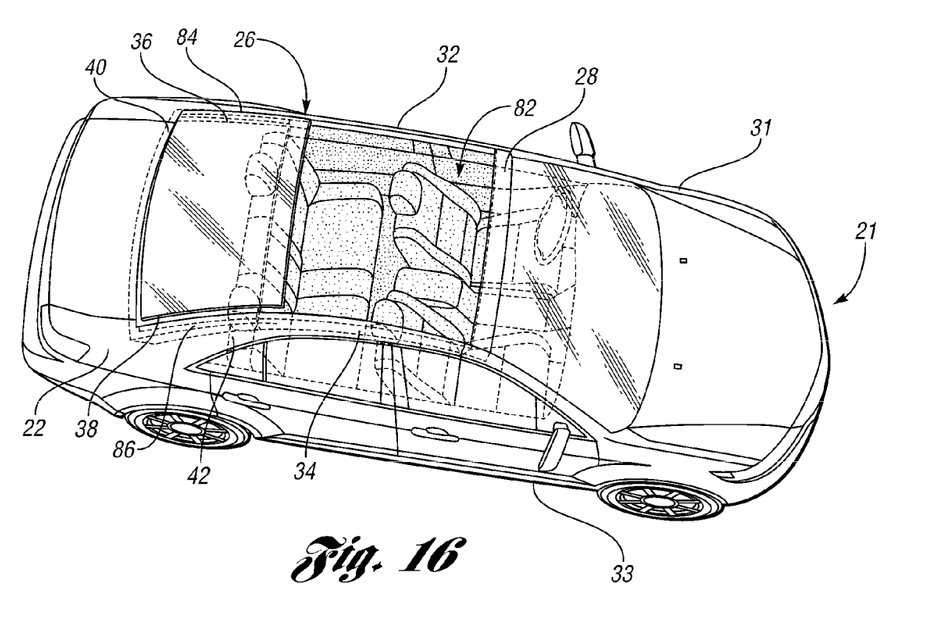
FIG. 16 is a perspective view of the roof module assembly of FIG. 15 in an extended position.

With reference now to FIG. 15-16, a vehicle 21 is illustrated with an embodiment of the roof module assembly 26. The vehicle 21 illustrated is a sedan although any suitable vehicle 21 is contemplated within the scope of the disclosed embodiments. In FIG. 15, the roof module assembly 26 is in a design position. In FIG. 16, the roof module assembly 26 is in an extended or open position.

Figure 17:
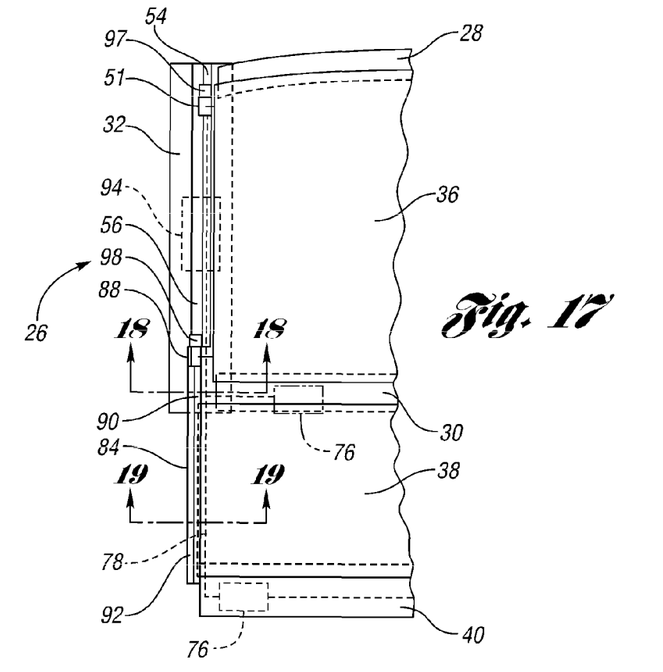
FIG. 17 is a top plan view of a portion of the roof module assembly of FIG. 15.

The roof module assembly 26 has a first cross member 28, a second cross member 30, and a third cross member 40, as illustrated in FIG. 17, that each provide support and structure for the roof module assembly 26. In FIGS. 15-16, the first cross member 28, the second cross member 30 and the third cross member 40 are covered by trim components 42. Under the trim components 42, the first cross member 28 is mounted to the vehicle body 22 near a front portion of the vehicle 21. The second cross member 30 is mounted between the first cross member 28 and the third cross member 40. The third cross member 40 is mounted on the vehicle body 22 towards a rear portion of the vehicle 21, which is opposite to the front portion. Of course, any suitable orientation for the first, second and third cross members 28, 30 and 40 is contemplated within the scope of the disclosed embodiments.

In the depicted embodiments, a first side rail 32 and a second side rail 34 are connected between the first cross member 28 and the second cross member 30. In another embodiment, the first side rail 32 and the second side rail 34 are elongated along an entire upper side profile of the vehicle 21 between the first cross member 28 and the third cross member 40. The first side rail 32 and the second side rail 34 may be bent as desired to alter the vehicle 21 profile. The first side rail 32 is mounted to the vehicle body 22 of the vehicle 21 along a first lateral side 31 while the second side rail 34 is mounted to the vehicle body 22 of the vehicle 21 along a second lateral side 33, opposite the first side.

As illustrated, a third side rail 84 is connected to the first side rail 32. The third side rail 84 spans from the first side rail 32 to the third cross member 40. In at least one embodiment, the third side rail 84 fits inside the first side rail 32. A fourth side rail 86 spans from the second side rail 34 to the third cross member 40. In at least one embodiment, the fourth side rail 86 fits inside the second side rail 34. As discussed in detail below, the third side rail 84 and the fourth side rail 86 may have a profile that is different from a profile of the first side rail 32 and the second side rail 34. Additionally, the third side rail 84 and the fourth side rail 86 may be bent as desired to alter the vehicle 21 profile.

As illustrated, the first side rail 32 and the second side rail 34 support a moveable front roof panel 36 while the third side rail 84 and the fourth side rail 86 supports a stationary rear roof panel 38. The third side rail 84 and the fourth side rail 86 are formed to allow movement of the moveable front roof panel 36 therealong. Although two roof panels 36, 38 are illustrated, it is to be understood that any suitable quantity of roof panels 36, 38 may be utilized within the scope of the multiple embodiments disclosed herein.

The first roof panel 36 and the second roof panel 38 collectively form a portion the roof module assembly 26 of the sedan vehicle 21. As illustrated on the sedan vehicle 21, the first roof panel 36 is orientated on top of the vehicle body 22 while the second roof panel 38 is angularly orientated relative to the first roof panel 36 and the vehicle body 22. In another embodiment, the first roof panel 36 and the second roof panel 38 are on a generally horizontal plane. In yet another embodiment, the first roof panel 36 is angularly orientated relative to the second roof panel 38 and the vehicle body 22. The first roof panel 36 and the second roof panel 38 may have any desired orientation relative to the vehicle body 22 in order to form at least a portion of the roof 24.

In the illustrated embodiment, the first roof panel 36 and the second roof panel 38 are made out of a transparent material and allow a complete view for an occupant from an interior of the vehicle 21 for the majority of the roof module assembly 26. Of course, any suitable material for the first and second roof panels 36, 38 is contemplated within the scope of the multiple embodiments disclosed herein, as discussed above.

From the design position, illustrated in FIG. 15, the first roof panel 36 is moveable to an extended position, illustrated in FIG. 16. In FIG. 16, the first roof panel 36 has moved so that the first roof panel 36 no longer covers a vehicle interior 82. As illustrated, the first roof panel 36 is generally oriented over the second roof panel 38 in the extended position.

With reference now to FIG. 17, yet another embodiment of a portion of a roof module assembly 26 is illustrated. The first side rail 32 and the third side rail 84 are illustrated but it is to be understood that the second side rail 34 and the fourth side rail 86 would have respective mirror images of the first side rail 32 and the third side rail 84.

The first side rail 32 is connected to the first cross member 28, the second cross member 30 and the third rail 84. As illustrated, the first roof member 36 is supported by the first side rail 32, the first cross member 28 and the second cross member 30. The first roof member 36 is also supported by the second side rail 34, as illustrated in FIG. 15. As discussed above, the first roof member 36 may be moveable between the design position, illustrated, and the extended position, illustrated in FIG. 16. In the extended position, the first roof member 36 may also be at least partially supported by the third side rail 84.

As depicted in FIG. 17, the third side rail 84 is connected to first side rail 32, the second cross member 30 and the third cross member 40. The second roof member 38 is supported by the third side rail 84, the second cross member 30 and the third cross member 40. In at least one embodiment, the second roof member 38 is stationary. Of course, it is contemplated within the scope of the disclosed embodiments that the second roof member 38 may be moveable.

The first side rail 32 and the third side rail 84 are connected. In one embodiment, the first side rail 32 and the third side rail 84 are press fit together. In another embodiment, the first side rail 32 and the third side rail 84 are welded together. The first side rail 32 and the third side rail 84 can be friction stir welded, cold metal welded, laser welded, or mechanically fastened together. In another embodiment, the first side rail 32 and the third side rail 84 are adhesively bonded together. Of course, any suitable manner of affixing the first side rail 32 and the third side rail 84 together is contemplated within the scope of the disclosed embodiments.

As discussed above, the first side rail 32 has a drive integrated roof track 54 and an idler integrated roof track 56. A first slider 51 is mounted to the first roof member 36 to move within the drive integrated roof track 54. In at least one embodiment, the slider 51 is driven by a motor 76 that is connected thereto by cable 78, as discussed above. The slider 51 may be a driven shoe 51. Of course, any suitable slider 51 is contemplated within the scope of the disclosed embodiments. A second slider 88 is mounted to the first roof member 36 to move within the idler integrated roof track 56. The second slider 88 may be physically attached and driven by the first slider 51 such that the second slider 88 is an idler support shoe. Of course, any suitable second slider 88 is contemplated within the scope of the disclosed embodiments.

Figure 18:
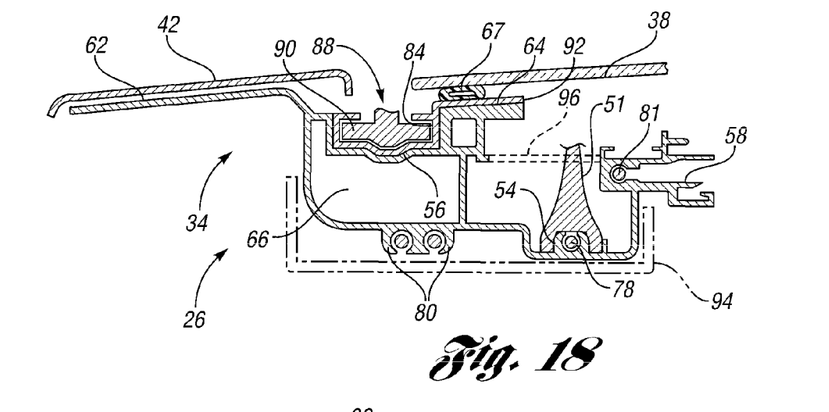
FIG. 18 is a cross-sectional view of a portion of the roof module assembly of FIG. 17 taken along the line 18-18.

As illustrated in FIGS. 17-18, the idler integrated roof track 56 interfaces with an integrated roof track 90 of the third side rail 84. The integrated roof track 90 of the third side rail 84 may be received within a portion of the idler integrated roof track 56 of the first side rail 32. The profile of the idler integrated roof track 56 of the first side rail 32 and the profile of the integrated roof track 90 of the third side rail 84 may the same or different. Of course, the idler integrated roof track 56 of the first side rail 32 and/or the integrated roof track 90 of the third side rail 84 may be machined or reformed to allow for a smooth transition between the idler integrated roof track 56 of the first side rail 32 and the integrated roof track 90 of the third side rail 84.

In FIG. 17, the integrated roof track 90 of the third side rail 84 receives the second slider 88 so that as the first roof panel 36 moves from the design position illustrated to the extended position, the second slider 88 can move from the integrated roof track 56 of the first side rail 32 to the integrated roof track 90 of the third side rail 84. In at least one embodiment, the second slider 88 remains within the integrated roof track 90 of the third side rail 84.

As illustrated in FIG. 17, cam blocks 97, 98 may be provided to allow the front roof panel 36 to transition up and over the rear roof panel 38 when transitioning from the closed design position illustrated in FIG. 15 to the open extended position illustrated in FIG. 16.

Figure 19:
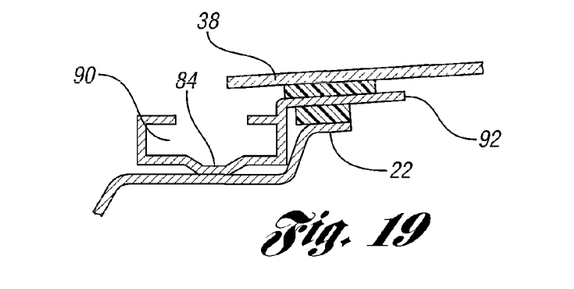
FIG. 19 is a cross-sectional view of a portion of the roof module assembly of FIG. 17 taken along the line 19-19.

As illustrated in FIGS. 17 and 19, the third side rail 84 may have a support flange 92. Of course, the fourth side rail 86 may also have a support flange 92. The support flange 92 may be integrally formed with the side rail 84 when each side rail is extruded. The support flange 92 facilitates assembly and mounting of the roof module assembly 26 to the vehicle body 22 and the rear roof panel 38 to the third side rail 84, as illustrated in FIGS. 15-16. A seal and/or adhesive can be provided between the flange 92 and the vehicle body 22 for sealing the connection of the third side rail 84 to the vehicle body 22. In addition, a seal and/or adhesive may be provided between the flange 92 and the rear roof panel 38.

Referring again to FIGS. 17-18, a support member 94 may be mounted to the first side rail 32. Of course, the second side rail 34 may also have a support member 94. The support member 94 may be provided proximate a known B-pillar of the vehicle body 22 to support the first side rail 32. The support member 94 is mounted to the first side rail 32 in a suitable manner, which include but is not limited to friction stir welding, adhesively bonding, cold metal welding, laser welding, or mechanically fastening. Of course, any suitable support member 94 is contemplated within the scope of the disclosed embodiments.

Referring now to FIG. 18, a reinforcement member 96 may be formed along a length of the first side rail 32 so that during manufacturing, the structural integrity of the first side rail 32 remains intact during the bending manufacturing process. Of course, the second side rail 34 may also have a reinforcement member 96. The reinforcement member 96 may removed, as illustrated, so that the front integrated track 54 can be connected with the first roof member 32, as illustrated in FIG. 17.

Of course, the reinforcement member 96 may be machined out or removed in any suitable manner along a portion of the first side rail 32 or along the entire length of the first side rail 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A panoramic vehicle roof assembly comprising:
    a first and a second cross member, each mounted to a vehicle at spaced apart locations;
    a first and a second extruded side rail, respectively mounted to the first and second cross members, each first and second side rail having a drive integrated roof track and an idler integrated roof track;
    a roof panel supported by the first and second side rails for movement between the first cross member and the second cross member within at least one integrated roof track of the first and second extruded rails;
    a third extruded side rail and a fourth extruded side rail, respectively mounted to one of the first extruded side rail and the second extruded side rail so that each third and fourth extruded side rail fits inside the respective first and second extruded side rail, each third and fourth extruded side rail having an idler integrated roof track formed therein along a length thereof; and
    a second roof panel mounted to the third extruded side rail and the fourth extruded side panel.

2. The panoramic vehicle roof assembly of claim 1 wherein the roof panel is further defined as a first generally transparent roof panel mounted to the first extruded side rail and the second extruded side rail for movement within the drive integrated roof track and the idler integrated roof track.

3. The panoramic vehicle roof assembly of claim 1 wherein the idler integrated roof track of the first and second extruded side rails and the idler integrated roof track of the third and fourth extruded side rails are connected such that the first roof panel is moveable therebetween.

4. The panoramic vehicle roof assembly of claim 1 wherein each of the third side rail and the fourth side rail further comprises a support flange adapted to mount the vehicle roof module assembly to the vehicle body.

5. The panoramic vehicle roof assembly of claim 1 further comprising a third cross member adapted to be mounted to a vehicle body such that the second cross member is oriented between the first cross member and the third cross member.

6. The panoramic vehicle roof assembly of claim 5 wherein the third cross member is mounted to at least the third and fourth extruded side rails.

7. The panoramic vehicle roof assembly of claim 6 wherein the first and second cross members are each mounted to the first and second extruded side rails.

8. The panoramic vehicle roof assembly of claim 1 wherein each of the first side rail and the second side rail further comprises a support flange adapted to mount the vehicle roof module assembly to the vehicle body.

9. The panoramic vehicle roof assembly of claim 1 wherein the first and second cross members are each mounted to the first and second extruded side rails.

10. The panoramic vehicle roof assembly of claim 1 further comprising a side support mounted to at least one of the first extruded side rail and the second extruded side rail for support thereof.

11. The panoramic vehicle roof assembly of claim 1 further comprising a reinforcement member integrally formed along at least a portion of at least one of the first extruded side rail and the second extruded side rail.

12. A panoramic vehicle roof module assembly comprising:
   a first cross member and a second cross member, each adapted to be mounted to a vehicle body at spaced apart locations;
   a first extruded side rail and a second extruded side rail, respectively mounted to one of the first and second cross members at spaced apart locations, each first and second side rail having a drive integrated roof track and an idler integrated roof track, each track formed therein along a length thereof; and
   a moveable roof panel supported by the first and second side rails for movement between the first cross member and the second cross member within the drive integrated roof track and the idler integrated roof track;
   a third extruded side rail and a fourth extruded side rail, respectively mounted to one of the first extruded side rail and the second extruded side rail, each third and fourth extruded side rail having an idler integrated roof track formed therein along a length thereof; and
   a fixed roof panel mounted to the third extruded side rail and the fourth extruded side,
   wherein the idler integrated roof track of the first and second extruded side rails and the idler integrated roof track of the third and fourth extruded side rails are connected such that the moveable roof panel is moveable therebetween.

13. The panoramic vehicle roof module assembly of claim 12 further comprising a third cross member adapted to be mounted to a vehicle body such that the second cross member is oriented between the first cross member and the third cross member.

14. The panoramic vehicle roof module assembly of claim 12 further comprising:
   a motor operably connected to the moveable roof panel with a cable to actuate the moveable roof panel between a design position and an extended position.

15. A method of manufacturing a panoramic vehicle roof module assembly comprising:
   extruding a first side rail having a plurality of integrated tracks formed therein in a single extrusion;
   providing a first cross member;
   providing a second cross member;
   mounting the first side rail to the first cross member and the second cross member;
   extruding a second side rail having a plurality of integrated tracks formed therein in a single extrusion;
   mounting the second side rail to the first cross member and the second cross member;
   extruding a third side rail having at least one integrated track formed therein in a single extrusion;
   extruding a fourth side rail having at least one integrated track formed therein in a single extrusion;
   mounting the third side rail to fit within one of the first side rail and the second side rail;
   mounting the fourth side rail to fit within the other of the first side rail and the second side rail;
   providing a third cross member;
   mounting the third cross member to the third side rail and the fourth side rail;
   providing a first generally transparent roof panel;
   mounting the first generally transparent roof panel to the first side rail and the second side rail for movement between the first cross member and the second cross member;
   providing a second generally transparent roof panel; and
   mounting the second generally transparent roof panel to the third side rail and the fourth side rail between the second cross member and the third cross member.

16. The panoramic vehicle roof assembly of claim 1 wherein the idler integrated roof track of each of the third and fourth extruded side rails is received within a portion of an idler integrated roof track of the respective first and second extruded side rails.

17. The panoramic vehicle roof assembly of claim 1 wherein the first roof panel is adapted to move between the first and second cross members by moving continuously along the idler integrated idler track of the first and second side rails and the integrated roof track of the third and fourth side rails.

18. The panoramic vehicle roof assembly of claim 12 wherein the idler integrated roof track of each of the third and fourth extruded side rails is received within a portion of the idler integrated roof tracks of the respective first and second extruded side rails.

19. The panoramic vehicle roof assembly of claim 12 wherein the movable roof panel is adapted to move between the first and second cross members by moving continuously along the idler integrated track of the first and second side rails and the idler integrated roof track of the third and fourth side rails.

* * * * *